No. 788,013. PATENTED APR. 25, 1905.
W. M. ARNOLD.
COMBINED COTTON CHOPPER AND CULTIVATOR.
APPLICATION FILED MAR. 29, 1904.
2 SHEETS—SHEET 1.
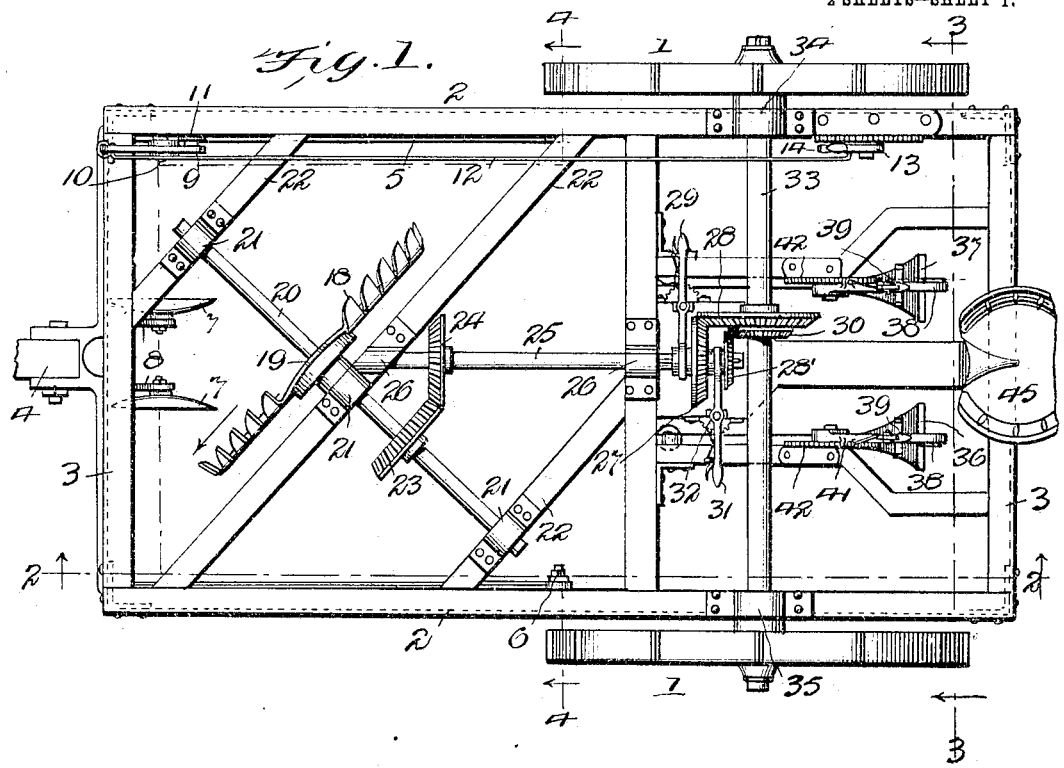
Witnesses
F. C. Barry
F. C. Crook
Inventor
W. M. Arnold
By W. T. Fitz Gerald
Attorneys No. 788,013. PATENTED APR. 25, 1905.
W. M. ARNOLD.
COMBINED COTTON CHOPPER AND CULTIVATOR.
APPLICATION FILED MAR. 29, 1904.
2 SHEETS—SHEET 2.
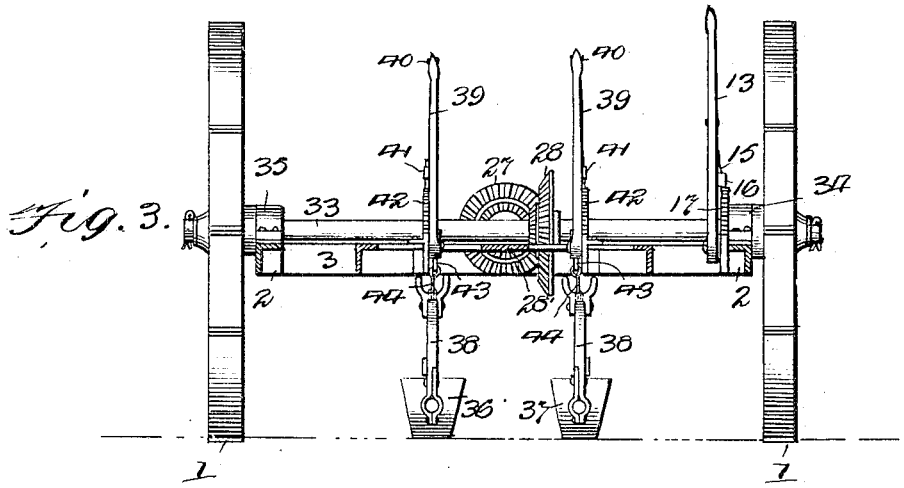
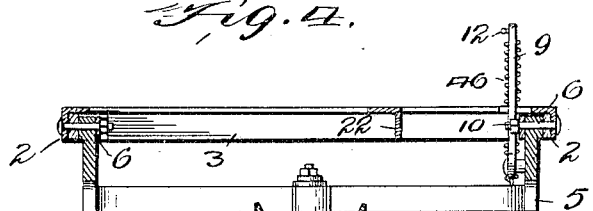
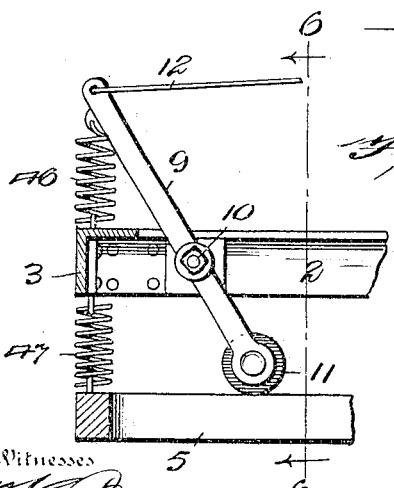
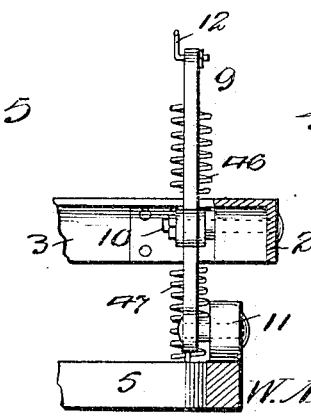
Inventor
W. M. Arnold No. 788,013. Patented April 25, 1905.

UNITED STATES PATENT OFFICE.

WILLARD MILES ARNOLD, OF WYNNEWOOD, INDIAN TERRITORY.

COMBINED COTTON CHOPPER AND CULTIVATOR.

SPECIFICATION forming part of Letters Patent No. 788,013, dated April 25, 1905.

Application filed March 29, 1904. Serial No. 200,595.

*To all whom it may concern:*

Be it known that I, WILLARD MILES ARNOLD, a citizen of the United States, residing at Wynnewood, Chickasaw Nation, Indian Territory, have invented certain new and useful Improvements in a Combined Cotton Chopper and Cultivator; and I do hereby declare the following to be a full, clear, and exact description of the invention, such as will enable others skilled in the art to which it appertains to make and use the same.

My invention has relation to combined cotton choppers and cultivators; and it consits of certain novel features of construction and combination of parts, the preferred form whereof will be hereinafter clearly set forth, and pointed out in the claims.

The prime object of my invention, among others, is to provide a combined cotton-chopping machine and a cultivator for the rows of growing cotton, both operations being performed at the same time in a thoroughly efficient and satisfactory manner.

A further object of my invention is to provide perfect control for the chopping device, whereby it may be run at any speed desired.

Another object is to provide an adjustability for the carrying-frame of the machine, whereby the chopping-disk may be caused to take deeply or lightly into the soil, as preferred.

Other objects and advantages will be hereinafter made clearly apparent, reference being had to the accompanying drawings, which are made a part of this application, and in which—

Figure 1 shows a top plan view of my invention complete ready for use. Fig. 2 is a sectional view of my machine on line 2 2 of Fig. 1, showing parts of the machine in side elevation. Fig. 3 is a sectional view of Fig. 1, taken on line 3 3. Fig. 4 is a sectional view of my machine, taken on line 4 4 of Fig. 1. Fig. 5 is a sectional view of a part of the frame of the machine, showing manner of adjusting the upper and lower sections thereon, while Fig. 6 is a sectional view of Fig. 5, taken on line 6 6.

In order to conveniently refer to the various details of my invention and the coöperating accessories, numerals will be employed, the same numeral applying to a corresponding part throughout the several views.

Referring to the numerals on the drawings, 1 indicates the carrying-wheels, while 2 and 3 designate the side and end bars, respectively, and 4 refers to the tongue, to which the draft-animals are attached in the usual manner. I also provide the auxiliary frame-section 5, which is pivotally secured, as indicated by the numeral 6, to the side bars 2, the said draft-tongue 4 being secured to this auxiliary frame. The forward end of the auxiliary frame is supported and guided by the disk wheels or blades 7, rotatably secured to the depending brackets 8, as clearly shown in Figs. 1 and 2. The forward end of the auxiliary frame-section is held a proper distance from the main frame-sections 2 by the controlling-lever 9, which is pivotally attached to the forward end of one of the side sections 2 in any suitable way, as indicated by the bolt 10, said lever being provided at its lower end with an antifriction-roller 11, designed to bear directly upon the upper side of the auxiliary frame 5, while the upper end of the lever is provided with a controlling-bar 12, extending backward into engagement with the actuating-lever 13, which latter is provided with an auxiliary thumb-lever 14, connected, by means of the rod 15, with the detent 16, which latter is designed to engage a segmental rack-bar 17, carried by a contiguous part of the frame. It is therefore obvious that by throwing the actuating-lever 13 forward the auxiliary and main frame-sections will be brought toward each other and that when the actuating-lever 13 is thrown backward said frame-sections will be separated from each other, the result being that the working parts carried by the main frame-section, as hereinafter explained, will be raised or lowered, as desired.

My cotton-chopper consists of the toothed disk wheel 18, having at certain intervals a deeply-formed notch or opening, as indicated by the numeral 19, there being preferably two of said deeply-cut notches. The remainder of the peripheral edge of the wheel 18 may be notched or left plain, as preferred, the object of the openings or notches 19 being to insure that a part of the cotton-plants will be left standing, while the intermediate parts are entirely cut away by the action of the rotating disk. The disk 18 is rotatably mounted upon the shaft 20, which is provided with suitable bearings 21 in the cross-bars 22, carried by the main frame-section or side bars 2 and the end members 3, as clearly set forth in Fig. 1. The shaft 20 is driven at the desired speed by suitable gearing, comprehending in this instance the gear 23, secured to the shaft 20, and the gear 24, keyed to the shaft 25, which latter also finds suitable bearings 26 in a suitable part of the frame, which will bring the gears 23 and 24 into coöperation with each other.

I have provided means for driving the shaft 25 at two relative speeds, which consists in securing to the inner end of the shaft 25 the driven gears 27 and 28′, both being so disposed upon the end of the shaft 25 that they will be independent of each other and, while so secured, that they must rotate with said shaft. They will have a sliding movement thereon, whereby the gear 27 may be brought into mesh with the driving-gear 28 or disposed out of mesh therewith, as desired, said control of the gear 27 being secured by means of the lever 29. In like manner I provide for moving the gear 28′ upon the shaft 25, whereby it will be brought into or out of engagement with the driving-gear 30 by means of the controlling-lever 31, each of the levers 29 and 31 having suitable rack-bars or detent-engaging teeth 32, whereby the gears 27 and 28′ may be held in an adjusted position either in or out of mesh with their respective driving-gear. It will be seen that the driving-gears 28 and 30 are keyed rigidly to the shaft 33, to which the carrying-wheels are secured, said shaft having proper bearings 34 and 35 in a contiguous part of the side members 2 of the main frame. Furthermore, I provide the cultivating or covering shovels 36 and 37, each having a carrying-beam 38, as is common, the forward ends of said beams being pivotally secured to a proper portion of the framework. Each of the plow bars or beams 38 is operatively connected with a controlling-lever 39, also having a thumb-lever or detent-controlling device 40 reaching into engagement with the detent 41, coöperating with the segmental rack 42, carried by the frame of the machine. Each of the levers 39 is provided with the angular extension or depending arm 43, as indicated by dotted lines in Fig. 2 and by full lines in Fig. 3. Each of the angular extensions 43 is connected directly with its respective beam 38, as by the link 44, and it is therefore obvious that by throwing the levers 39 forward one of the beams 38 may be raised, while said beam may be readily lowered by moving said lever rearwardly, each of the levers being held in an adjusted position by its respective detent 41 and coöperating segmental rack 42. By means of the adjustable gears 27 and 28′ it is obvious that two relative speeds may be imparted to the shaft 25 as desired by the operator—that is to say, when the gear 27 is thrown into mesh with the gear 28 the gear 28′ will be left out of mesh with the gear 30, and the result will be that the shaft 25 will be rapidly driven. When, however, it is desired to drive the shaft 25 at a relatively lower speed, the gear 27 will be thrown out of mesh with the gear 28 by simply moving the lever 29 rearwardly and securing it by means of its detent and its rack-bar 32. The gear 28′ will then be moved into mesh with the gear 30 by moving the lever 31 forward and thereupon secure it in an adjusted position by its rack-bar 32 and coöperating detent, as will be obvious. I have also provided a seat at a convenient point, as indicated by the numeral 45, whereby the operator will be placed in a convenient position to control any of the levers which have been provided to accomplish the different results set forth.

It will be observed that the lever 9 is held normally forward by the compression-spring 46 and that the main and auxiliary frame-sections are held normally toward each other by the compression-spring 47, though the last-mentioned spring may not always be regarded as absolutely essential, inasmuch as the weight of the main frame-section would be sufficient to accomplish the same result. The lower end of the controlling-lever, as will be observed, is provided with the anti-friction-roller 11, designed to travel upon the upper edge of the auxiliary frame-section 5, thus insuring the freedom of action and easy control or manipulation of said parts.

It will thus be seen that I have provided a very simple though reliably-efficient machine of the character specified, which will not only so act upon the rows of growing cotton as to leave a desired quantity of the growing stalks in place, but that the act of chopping the cotton will be followed by a thorough cultivation thereof through the mediation of the cultivator-shovels 36 and 37, which latter may be disposed at any desired depth in the soil by a proper manipulation of the controlling-levers 39, as will be obvious.

Believing that the advantages and construction of my invention have thus been made clearly apparent, further description is deemed unnecessary, though it may be stated that the operation is as follows: The machine is drawn over the ground in the usual manner, whereby a draft-animal will be disposed upon either side of the row of growing plants and the rotation of the chopping-disk 18 will be properly regulated by means of the gears 27 or 28′, as preferred, and the result will be that all of the growing cotton-plants will be cut away, excepting those left standing by means of the open sections or notches 19 provided in the cutting-disk, it being understood by reference to Figs. 1 and 2 that said cutting-disk is disposed obliquely to the plane of the row of plants. The plants left standing in the row will therefore be at regular intervals and their distance apart, or the amount of space left between each group of plants, will be determined by the speed of rotation of the disk, as will be clear from the foregoing specification considered in connection with the accompanying drawings.

Having thus fully described my invention, what I claim as new, and desire to secure by Letters Patent, is—

1. In a cotton-chopper the combination with a main frame having supporting-wheels and a chopper-disk mounted thereon, of an auxiliary frame pivotally secured to said main frame, supporting means for the free end of said auxiliary frame, a spring 47 adapted to keep said main and auxiliary frames in juxtaposition to each other, a controlling-lever 9 pivotally secured to said main frame, an antifriction-roller carried by said lever and adapted to rest upon a contiguous part of said auxiliary frame, an actuating-lever 13 carried by the main frame and a controlling-bar connecting said lever 13 and the upper end of said controlling-lever 9, whereby when the lever 13 is actuated the forward end of the main frame and the chopper-disk carried thereby, will be raised or lowered, and a spring to move said lever 9 in the opposite direction when the actuating-lever is released, one end of said spring being secured to the main frame and the opposite end to the free end of said controlling-lever, as set forth.

2. In a cotton-chopper the combination with a main frame carrying a chopping-disk, of an auxiliary frame pivotally secured to said main frame, a spring interposed between the free ends of said main and auxiliary frames adapted to hold the same in juxtaposition to each other, a controlling-bar pivotally secured to said main frame and carrying an antifriction-roller at its lower end adapted to engage a contiguous part of the auxiliary frame and means to operate said controlling-lever, whereby the forward end of said main frame and chopper-disk carried thereby may be raised or lowered as desired, and a spring secured at one end to the main frame and its opposite end to the upper end of said controlling-lever whereby said lever will be returned to its normal position when the operating means is released, as set forth.

In testimony whereof I have signed my name to this specification in the presence of two subscribing witnesses.

WILLARD MILES ARNOLD.

Witnesses:
N. G. PERKINS,
V. F. EUBANK.